US007788816B2

(12) United States Patent
Hembree

(10) Patent No.: US 7,788,816 B2
(45) Date of Patent: Sep. 7, 2010

(54) GPS COORDINATE TRANSFORMER

(76) Inventor: Wayne A. Hembree, 16311 Oxford Cir., Bowie, MD (US) 20715

( * ) Notice: Subject to any disclaimer, the term of this patent is extended or adjusted under 35 U.S.C. 154(b) by 261 days.

(21) Appl. No.: 11/575,291

(22) PCT Filed: Sep. 13, 2005

(86) PCT No.: PCT/US2005/032311

§ 371 (c)(1),
(2), (4) Date: Aug. 28, 2008

(87) PCT Pub. No.: WO2006/031682

PCT Pub. Date: Mar. 23, 2006

(65) Prior Publication Data
US 2008/0307661 A1 Dec. 18, 2008

Related U.S. Application Data

(60) Provisional application No. 60/609,261, filed on Sep. 14, 2004.

(51) Int. Cl.
G01C 21/20 (2006.01)
B43L 7/10 (2006.01)
(52) U.S. Cl. ............................ 33/427; 33/431; 33/1 CC
(58) Field of Classification Search .................... 33/1 C, 33/1 CC, 427, 428, 431, 456, 457, 464, 624, 33/679; 206/305; 353/11
See application file for complete search history.

(56) References Cited
U.S. PATENT DOCUMENTS

| 1,110,901 | A | * | 9/1914 | Cowles | 33/431 |
| 1,208,024 | A | * | 12/1916 | Sinclair | 33/427 |
| 1,301,273 | A | * | 4/1919 | Kolloster | 33/431 |
| 1,673,836 | A | * | 6/1928 | Littlehales | 33/431 |
| 3,381,387 | A | * | 5/1968 | Landrum, Jr. | 408/241 B |
| 3,690,009 | A | * | 9/1972 | Henley, III | 33/1 MP |
| 4,090,301 | A | | 5/1978 | Della Monica | |
| 4,157,626 | A | * | 6/1979 | Bedinghaus | 40/518 |
| 4,352,247 | A | * | 10/1982 | Rohde | 33/428 |
| 4,388,765 | A | * | 6/1983 | Dearman | 33/464 |
| 4,422,738 | A | * | 12/1983 | Steele | 353/11 |
| 4,882,847 | A | | 11/1989 | Hemmelgarn et al. | |
| 5,372,250 | A | * | 12/1994 | Johnson | 206/769 |
| 5,386,640 | A | | 2/1995 | Chen et al. | |
| 5,404,648 | A | * | 4/1995 | Taylor, Jr. | 33/431 |
| 5,461,794 | A | * | 10/1995 | Huang | 33/470 |
| 5,956,856 | A | | 9/1999 | Chen et al. | |
| 7,269,909 | B1 | * | 9/2007 | Barbieri | 33/419 |

FOREIGN PATENT DOCUMENTS

CH 680615 A5 * 9/1992
WO WO 9702468 A1 * 1/1997

* cited by examiner

Primary Examiner—R. A. Smith
(74) Attorney, Agent, or Firm—Miles & Stockbridge P.C.; David R. Schaffer, Esq.

(57) ABSTRACT

A coordinate transformer that includes foldable horizontal and vertical members utilizes GPS provided map coordinates to assist with location determination on a handheld map. Typically, GPS receivers provide accurate location information but their display size, memory and battery life prohibit the amount of topographic information that can be displayed in context, to a user. Through the use of the coordinate transformer, an ambulatory user is provided with an accurate location indication displayed within the context of a large portion of an actual topographic map, and the user is also able to determine the coordinates of a location of interest on the map for transfer to an internal or external unit.

29 Claims, 13 Drawing Sheets

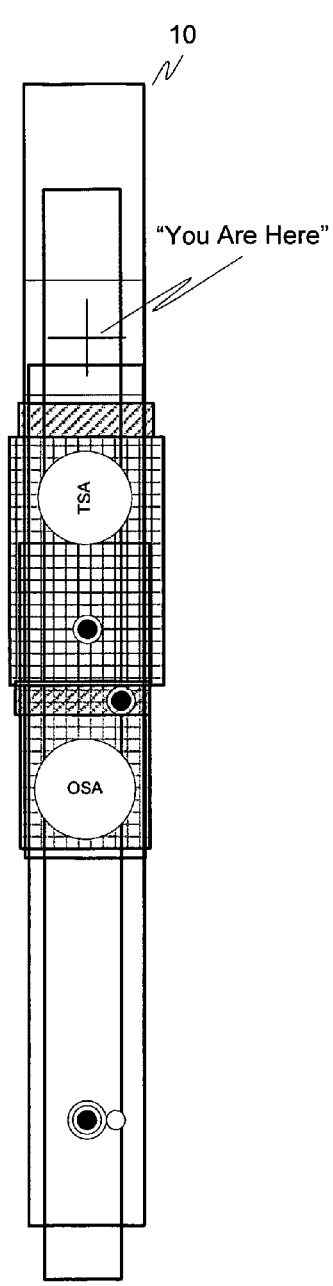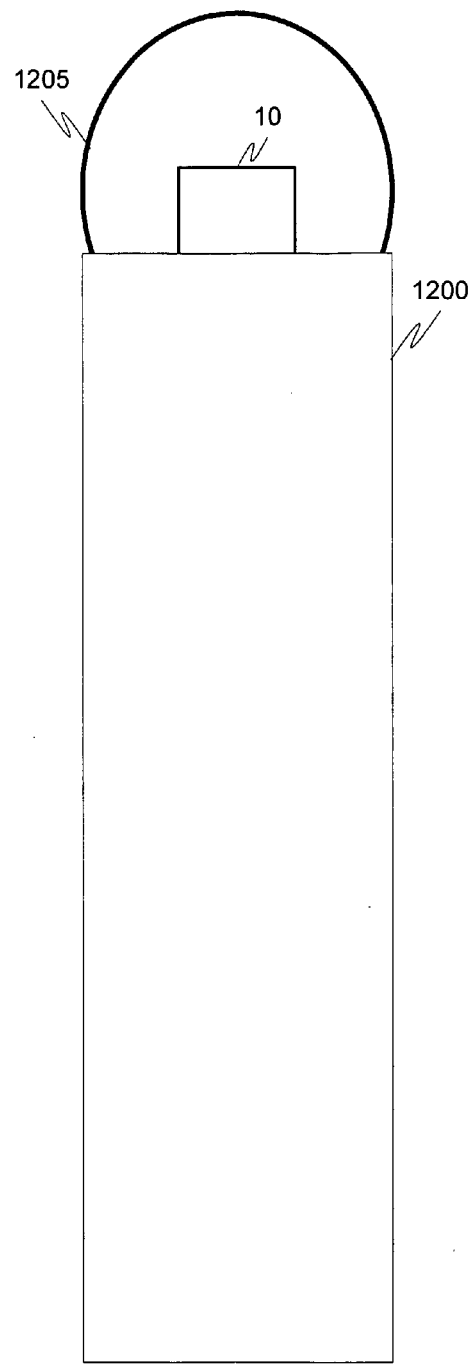
Fig. 11
Fig. 12

GPS COORDINATE TRANSFORMER

RELATED APPLICATION DATA

This application claims the benefit of and priority under 35 U.S.C. §119(e) to U.S. Provisional Application. No. 60/609,261, entitled "GPS Coordinate Transformer," filed Sep. 14, 2004, which is incorporated herein by reference in its entirety.

BACKGROUND

1. Field of the Invention

This invention relates generally to navigation. In particular, an exemplary aspect of this invention relates to coordinating Global Positioning System (GPS), or other system, provided coordinates with a physical map. Another exemplary aspect of this invention relates to a device for use in conjunction with a GPS receiver that allows one to pinpoint an exact location on a map.

2. Description of Related Art

Various devices have been developed since the 1800s to aid in maritime navigation by adjusting sliding devices along scales made parallel to the edges of the maritime charts to determine intermediate latitudes and longitudes. From this, a location coordinate on the map could be determined. Most of these devices assume a flat surface such as a table, or some other near horizontal surface upon which to place the chart and device. Some devices have also been developed for aeronautical navigation and some have anticipated land navigation but assume use in a land vehicle where support would be available.

The GPS is a constellation of satellites which orbit the Earth. This system was developed by the U.S. military, however became publicly available to assist the public with global navigation. With advent of the GPS satellite system and the current state of GPS receivers, an ambulatory person can see their location on a map displayed by the GPS receiver. GPS receivers provide accurate location information but their display size compromise the amount of topographic information that can be displayed in context, to a user.

A user can connect the GPS receiver to a portable computer with a large screen which would then display the necessary topographic detail in context with a large enough map area for navigation and planning purposes, but for many ambulatory persons this is not a practical solution because of weight, battery life, cost and operational difficulties. It is still useful for ambulatory persons to use a handheld map and transform the GPS provided map coordinates onto the map for their en-route navigation and planning.

A simple device exists to aid in the transformation of the GPS provided coordinates by providing small orthogonal scales on a transparent base that are held against the map at the appropriate intersection of two coordinate lines. The device is then moved horizontally and vertically on the map parallel to the map coordinate lines, to arrive at the actual position on the map between lines that the GPS provided coordinates represent. This is a simple method but it is prone to interpretation and operator error in field conditions utilizing hand-held maps.

SUMMARY

Whereas the use of latitude and longitude are preferred by maritime navigators, the slightly less accurate Universal Transverse Mercator (UTM) and the military equivalent Military Grid Reference System (MGRS) coordinate systems, have great advantages for on-foot persons who are not concerned with the small errors, because one scale fits all maps of a group, independent of latitude. However this advantage is coupled with a small angle coordinate line orientation error relative to Truth North, and therefore a UTM/MGRS based system must accommodate those errors which vary in positive and negative directions depending on the longitude within the UTM/MGRS zone. Most of the prior art systems are oriented to True North and do not accommodate the UTM/GPRS coordinates.

An exemplary aspect of the invention overcomes the aforenoted deficiencies and in addition provides a quick, accurate and convenient method of transforming coordinates, including those utilizing the UTM/MGRS system, to a position on a map by a person on foot with the map and device hand-held, and this can be arranged to be suspended on the front of the body for quick use and temporary stowing, and in addition this is coupled with a folding scheme for longer term stowing, that provides dimensions that allow easy insertion and recovery of the folded device and rolled map into, for example, a body mounted holster which can be fitted to eliminate interference with other gear carried on the operators body, and also fitted so as not to interfere with the operator taking evasive action or with walking, running, riding, crawling or the like.

An aspect of the invention provides a mechanism for an operator on foot that can be fitted to a folded map that may be placed in a transparent map holder, and caused to indicate the position on the map of various given coordinates, while holding the mechanism, fitted holder and map by hand, without other support.

Another exemplary aspect of the invention provides a means for adapting the mechanism and map/holder to a size no greater than that which can be affixed to the operator's person in a way that does not interfere with use of a backpack or items carried on the operator's belt, while allowing full freedom of movement to accommodate evasive action and the mobility of crawling, walking and running.

Another exemplary aspect of the invention provides operation of a mechanism with coordinate transformation and the means for adapting for mobility, as simple, quick and self explanatory operations.

Another exemplary aspect of the invention is directed toward a mechanism with fully manual operation without need for battery power, and to provide various levels of automation to the mechanism with the addition of battery power.

Another exemplary aspect of the invention provides a protractor that can be placed on the "you are here" point so that compass direction to another point can be easily read by extending a retractable cord over the "you are here" point, to a point of interest. The protractor can then be folded up along the vertical arm for storage by using only one 100° straight scale on an offset arm that rotates in four 90° steps with four sets of numbers placed alongside the 100° scale. When the partial protractor is rotated so the positioned retractable cord crosses over the 100 degree segment, the set of numbers that are right side up are the ones used for reading the heading to the desired point, and a compensation for magnetic declination can be included.

These exemplary aspects and their attendant advantages are accomplished by an exemplary embodiment of the present invention by a near vertical, in the plane of the map, arm with a front and back slide-base separated by a slot that allows a map or map holder to slide through it and be locked to it at skewed angles to accommodate map misalignment and UTM/MGRS angle errors. On either side of the vertical slide base is a lockable slide upon which a foldable horizontal arm may be placed that is perpendicular to, and in the plane of the vertical arm and map holder. Upon the horizontal arm slide base is a lockable slide upon which is a projection that indicates the location on the map referred to by the input coordinates, after the operator holding the mechanism and map holder by hand and without other support, adjusts the mechanism to fit the coordinate information. The size of the vertical arm with the horizontal arm folded to the vertical position and the map and map holder rolled around it, is such that it can fit into a body mounted holster that secures it to an average adult person without interfering with the person's backpack or belt mounted equipment, but allowing the person full mobility of crawling, walking, riding and running while accommodating any map, such as maps typical of the USGS topographic type at 1:24,000 to 1:100,000 scales.

In accordance with one exemplary feature of the invention, the vertical arm has a slide-base fitted to the front and another slide-base fitted to the back, with a space between them to allow the map holder to slide through the opening horizontally, with an upper and lower thumb screw to lock the arm to the map holder which has been manually aligned with a vertical coordinate line (East Line) on the map and which may be skewed by up to a few degrees relative to the vertical edge of the map holder. The length of the vertical arm is made to accommodate a map holder for a typical topographic map folded in half horizontally, such that the vertical arm can be locked in a skewed position to the upper and lower edges of the map holder. The halves of the map may be viewed by choosing the desired side of the map holder, and the mechanism can be duplicated in each side's slide base or one mechanism can be transferred to the desired side slide base. Other sizes may be used, however increasing the length of the vertical arm may require additional folding to be accommodated by the design to keep it within the capability to be stowed on a mobile person.

In accordance with another exemplary feature of the present invention, a lockable slide that slides within the vertical slide-base, has attached a horizontal arm which has an easting attachment housed above and a northing attachment housed below the horizontal arm, relative to the map plane. Upon the horizontal arm the easting attachment is fastened in such a manner that it is allowed to slide along the horizontal arm and be locked at intervals to the horizontal arm. An east step slide is mounted in the easting attachment above the horizontal arm. The easting attachment is moved by the operator until its index-line lines up with the Easting line coordinate given by the GPS. The easting step slide is then moved to align its scale with an index line on the easting attachment, using the East Step coordinate number provided by the GPS. The east step slide has a projection that extends below the horizontal arm through a slot in the horizontal arm placing it in contact with the northing attachment that causes the northing attachment to slide east and west with the adjustment of the east step slide moving east and west. The northing attachment contains a Northing step slide and the attachment with slide can be rotated by the operator to place the northing step slide orthogonal to and either above or below the horizontal arm and in its plane, the orientation being chosen by the operator for clarity, based upon best readability for the portion of the map in use. The rotation of the northing attachment and slide can also be stopped midway by the operator, placing it parallel to the horizontal arm for stowing. The Northing step slide also slides through the northing attachment allowing it to be adjusted to the GPS provided North Step coordinate based on a scale affixed to it being moved relative to an index on the northing attachment. The northing attachment also has attached a Northing line index marker. In initial setup the slide in the vertical slide-base is adjusted by the operator to place the Northing line index marker on a convenient Northing Line chosen for clarity, and locked in preparation of subsequent use.

The Northing step slide extends for approximately the vertical length of the map and moves up or down one UTM segment width as the operator adjusts it. In addition there is a slide with a "bulls-eye" on it that slides up or down the Northing step slide that is lockable. To choose the correct Nothing line, before other adjustments the Northing slide is set to zero and the "bulls-eye" is slid to the Northing line corresponding to the given coordinate Northing Line and locked. Then when the other three adjustments have been made (Northing Step, Easting Line and Easting Step) the "bulls-eye" sits over the "you are here" spot.

In accordance with an additional exemplary feature of the present invention, a horizontal arm is affixed onto the pivot that extends from the slide on the vertical arm, so that the horizontal arm can be held in a direction perpendicular to the vertical arm on either side, and in a plane parallel to the map holder, for use, and can also be pivoted plus or minus 90 degrees relative to its "use" position to stow the horizontal arm in a vertical direction (in a plane parallel to the map holder) to prepare for extended period mobility. In accordance with a further exemplary feature of the present invention, there are two ways of stowing the device and map when the operator is moving.

There is a quick response stow method and a holstered stow method. The quick response stow method provide a means to fasten the side ends of the map holder together so that only the usable portion of the map is adjacent to the operator. The bottom of the vertical arm contains a device that holds it to one side of the operator's front belt line. The top of the vertical arm has an adjustable loop fastened that can go between the front and back portions of the map and fastens to the belt line on the other front side of the operator. To use, the operator adjusts the length of the adjustable loop to provide a loop that goes over the head and allows the map and mechanism to stow in front of the operator at chest level. When the map is needed, the operator raises the loop over the head and the map drops down for use, held near to the operator's waist. When the operator wishes to stow again the loop is returned over the head. This quick stow response stow method can be stand alone, or can be combined with the holstered stow method.

In the holster stow method, a holster is provided that fits the folded mechanism with map holder and map rolled around it, to be secured on a persons body for mobility including evasive action, crawling, walking, riding and running. The holster can be suspended from adjustable straps that are attached to the body. The bottom of the holster can attach, for example, to a horizontal seam of clothing around the waist such as a trouser top or belt. To use the holster, the horizontal arm of the mechanism is folded to the vertical position and the map holder, with map inside, are rolled around it so that a compact package is obtained. The package is placed in the holster and a fastener system emanates from the holster support strap to lock the top of mechanism to the holster and to pull it close to the upper body. The adjustable strap can be loosened for normal activity and tightened for running and crawling where the holster must stay very close to the body. The bottom of the holster can be adjusted so that the holster can be used above backpack belts and equipment on belts. The location of the holster can be the side of the carrier's chest and pointed slightly outward, but with enough room not to interfere with backpack straps. Other positions are also possible. The holster can sit above the belt line enough that when crawling on hands and knees, or mounted in a saddle, it does not interfere with the bent upper leg. In accordance with another exemplary feature of the present invention, methods of automating portions of the transformation operation are described. An exemplary intent of the automation is ease of use by decreasing chance for operator error, decreasing the level needed for operator training, and to speed up transformations. The map holder, map, a vertical arm that locks onto the map holder along a vertical coordinate line and the stowing methods are basic to both the manual and also to all the automated modes. In all automated modes, a power source such as a battery, solar cells and/or the like, are added to power an electronic controller and in the more automated versions, power electric motors.

The exemplary electronic controller provides: 1) an input-output communication device to acquire and return coordinate and other information; 2) a display for the operator; 3) an operator input means; and 4) mechanism position indications and output control signals used for directing the operator to adjust the transformer mechanism or cause the controlling-motors to adjust it. The input-output communication devices to acquire or return coordinate or other information can be: A) a manual input from the operator; or B) a wired or wireless transfer in communication with a local GPS or a remote site. The display for the operator can provide the entire coordinate information and can organize the information to make it more useful to the operator, such as allow the operator to insure that the correct map is being used, and to allow the operator to choose the correct side of the map to display, translate coordinate information to operator directives, and for general operator information. An operator input allows adding information for calibration that cannot be automatically read from the map and the operator can cause measured information of the coordinates from a point of interest on the map to be transferred to the local GPS or a remote site. The output control signals can go to audio and/or visual guides to the operator who moves the slides under such guidance until they represent the position on the map of the input coordinates, resulting in a low-power system. The output control signals may also go to motors which provide the movement but requiring somewhat higher power. All slide bases can have index marks that are read by distance measurer sensors and provide the feedback to the controller to use in calculations of output control signals. All of these automated modes may require a calibration step before use, after a new map has been inserted in the mechanism and it is also prudent to re-zero the distance measurers periodically during use.

At the start of operations on a newly inserted map, a calibration cycle is initiated. The controller displays the desired East and North line numbers for the input coordinates given. The operator may use the most significant digits, as in the manual mode, to confirm that the correct map is in place and the operator locks the vertical arm to a convenient vertical coordinate line on the map. A limit indicator is then moved towards the bottom of the Vertical arm to mark the position of the South-most horizontal coordinate line on the map, and locked. The vertical arm slide that positions the horizontal arm is then moved to that position, the mechanism on the horizontal slide is moved back to it the west-most limit and the distance measurers commanded to be zeroed. It is also necessary that the controller know what the calibration coordinate line numbers are. These digits can be entered through the operator input and can be entered serially with a rotary switch to eliminate necessity for a keyboard. To reduce complexity only the number that is the difference between the GPS supplied line coordinates and the limit line coordinates need be transferred. After the calibration, all new coordinates can be located automatically by the system until the map needs replacement, or map sides changed.

In the exemplary automated versions of coordinate transformation operation, the linear adjustments for the Northing and Easting steps can be made by the operator following visual or audible clues based on the desired position and measurement of the current position. The Easting line adjustment can be made by the operator by visual or audible clues indicating the correct detent along the horizontal arm. The Northing line adjustment is made automatically by the controller lighting a light at the correct selection on the northing arm, which is known after calibration. As an alternative the Northing and Easting steps and the Easting line can be adjusted by motors while the Northing line can still be selected by lighting a light at the proper location. These implementations may be accomplished while still maintaining the stow-ability mechanisms of the manual method. Another exemplary embodiment replaces the horizontal arm with a light-beam projecting from the correct position on the vertical arm and being intersected with another light-beam that is in correct position along a fixed horizontal arm, or mounted on the vertical and rotatable to intersect with the horizontal beam at the desired position. Other methods of mounting the two light beam sources can obtain the same results.

It is also possible to have both sides of the map with mechanisms that are both calibrated, in which case when the limit on one map is reached the controller would be able to move and provide the location on the other side while alerting the operator to the change. In this case the vertical arm locking mechanism on the end of the arm away from the map fold could have independent locks on each side.

The same techniques of transformation and location can be applied to full maps without folding, which may be useful in stationary situations. However, the unfolded maps are too large for use by mobile persons with hand held maps. Maps may also be made with coordinate lines able to be read electronically which would reduce chance for operator error and speed operations as well.

Additional exemplary embodiments include the device taking coordinates, such as might be supplied by a GPS receiver, and placing the position indicated by the coordinates on a map or chart contained in a transparent container. The device is particularly useful to a person on foot in the field, and does not require any additional support. The device is also usable in land, airborne and maritime vehicles, animal-borne and cycle-borne riders as well as on stationary tables in vehicles or buildings.

To aid in use by a person on foot, the device folds up for transport utilizing all captive parts, allowing the map/chart holder, the map/chart and the device to be rolled into a small diameter cylinder for ease of transport in a backpack or similar carrying container.

The exemplary coordinate transformer has room in the map container to provide complete operational instructions on use of the device, including a pictorial decomposition of the UTM digits or the MGRS alpha-numerics as they would appear on the GPS readout. The decomposition results in designation of an Easting Line and a Northing Line, and an Easting Step and a Northing Step, and information that insures one has the correct map.

The East Line is used to set and lock the mechanism on the horizontal arm. The North Line is used to set and lock the slide on the northing step slide. The Easting Step is used to adjust a horizontal slide against a scale where it is locked. The Northing Step is used to adjust a vertical slide against a scale where it is locked. At the end of those operations the result appears under a small aperture with "cross-hairs" around it, at a location that indicates "You are here." The defined location can be marked on the map container through the "You are here" aperture with an appropriate pen.

The exemplary device can be of all manual operations, requiring no electrical power, except for the GPS needs. The device can also be made to include some electronic automation, if some source of power is provided. Various levels of automation are possible, and deriving information directly from a connection to the GPS is basic to most.

The exemplary general method of this invention starts with a calibration step that sets moveable arms to fixed positions on a map. This then is followed by conversion of given coordinate sets to directives that direct the arms to be moved to place an indicator-point anywhere on a map to indicate the position on the map corresponding to a given coordinate set. The directives are determined by knowing the scale of the map, the limits of the map and the equations describing arm movement. The calibration does not have to be repeated until a different portion of the map, or a different map is needed.

A non-limiting implementation utilizing the UTM coordinate system will be described in detail because the arm scales remain fixed for all latitudes within a full set of maps such as all the 7.5' topographic maps of the 48 contiguous United States, and therefore do not need map dependent scale calculations to determine the directives. This provides a basic mechanism with fixed scales on the arms which may not need electronic calculation and therefore may not need a power supply such as a battery (although user utility can be enhanced by adding powered electronics).

In addition other coordinate systems that have scale changes over the range of maps require new scales to be substituted whenever a map scale changes. Another exemplary embodiment employs a controller that can calculate directives for using the fixed scale markings existing on the moveable arms but calculate the appropriate directive without changing scales on the arms. This could be particularly useful for, for instance, the latitude-longitude coordinate system in which the longitude scales change with latitude, but may require a power supply for the calculations.

Further, while the UTM implementation example uses arms related to rectangular coordinates, other arm arrangements can use other systems such as a polar coordinate implementation. Illustrating that the system is not limited to a particular arm arrangement, a system using a polar coordinate basis is also shown in which after calibrating the arm(s), an angle and a length can be used to move the indicator point over the position that represents the given coordinate set on the map.

For the system using UTM coordinates, the UTM coordinates can be converted to associated polar coordinates in a GPS or externally in a powered controller. And given a powered controller, latitude-longitude coordinates, and other coordinate systems that have scale changes on different maps can also be implemented in the rectangular coordinate based mechanism, the polar coordinate based mechanism and other similar mechanisms.

All of these implementations can have folding arms that stow in alignment with each other and allow the map/map-holder to be rolled up around the folded arms and placed in a holster fitted to the body of an average adult while allowing full mobility of walking, running and of riding.

These and other exemplary embodiments and aspects of the invention will be described in relation to the following detailed description.

BRIEF DESCRIPTION OF THE DRAWING

FIG. 11 illustrates the exemplary coordinate transformer in a folded position;

FIG. 12 illustrates the coordinate transformer in an exemplary protective pouch according to this invention;

DETAILED DESCRIPTION

The exemplary systems and methods of this invention will be described in relation to a coordinate transformer mechanism. However, to avoid unnecessarily obscuring the present invention, the following description omits well-known structures and devices. For the purposes of explanation, numerous specific details are set forth in order to provide a thorough understanding of the present invention. It should be appreciated, however, that the present invention may be practiced in a variety of ways beyond those specifically set forth herein. For example, the various features illustrated in the differing embodiments can be combined into one or more additional embodiments that are not illustrated. For example, the linear scale feature of the invention could be combined with the display apparatus illustrated in conjunction with the embodiment shown in FIG. 6 and, for example, information from the linear scale used to assist with the placement of the "You Are Here" crosshairs as previously discussed.

Figure 1:
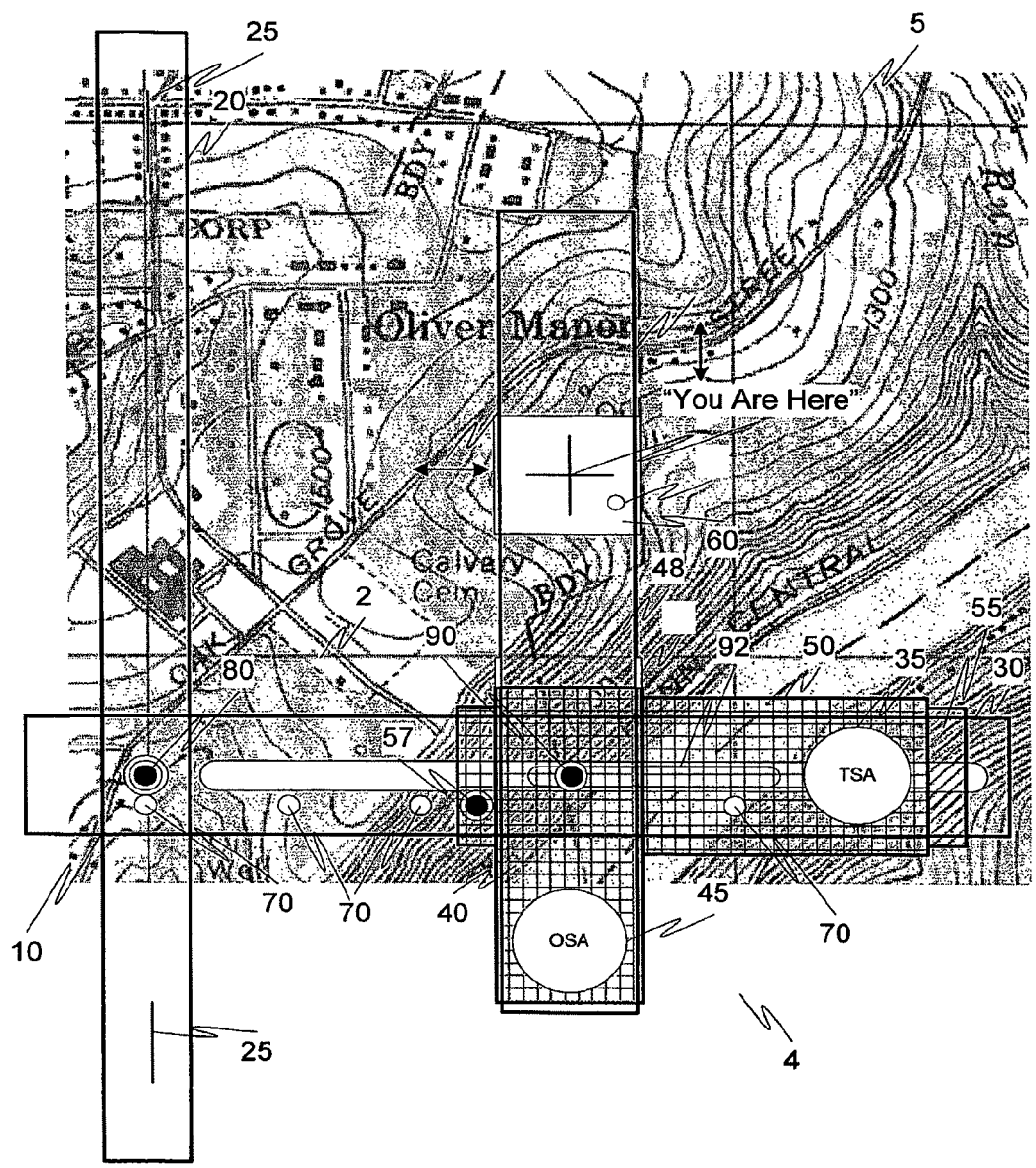
FIG. 1 illustrates an exemplary environmental view of the GPS coordinate transformer according to this invention.

FIG. 1 illustrates an exemplary embodiment of the coordinate transformer 10. The coordinate transformer 10 comprises an alignment arm 20, a traverse arm 30, an orthogonal attachment 40, a traverse attachment 50, a traverse step slide 55, an orthogonal step slide 48 and a You Are Here slide 60.

As illustrated in the environmental view of FIG. 1, the coordinate transformer 10 is secured to a map 5. The coordinate transformer 10 comprises an alignment arm 20 and a traverse arm 30. The alignment arm 20 has alignment arm alignment marks 25. The traverse arm 30 is pivotably attached to the alignment arm 20 via the traverse arm-locking pivot 80. Moving in increments relative to detents 70 in the traverse arm 30 is the traverse attachment 50, which may be temporarily fixed to one of detents 70 by a pivot 57, upon which the orthogonal attachment 40 moves in a transverse direction by attachment to the transverse step slide 55. Within the traverse attachment 50 the traverse step slide 55 moves in a transverse direction and within the orthogonal attachment 40 the orthogonal step slide 48 moves in orthogonal direction. Slideably attached to the orthogonal step slide 48 is the You Are Here slide 60.

While the coordinate transform is illustrated as being constructed of a transparent or partially transparent material, such as a clear plastic or a plastic-like material, it should be appreciated that the coordinate transformer or portions thereof can be made of differing types of materials that may or may not be transparent including, but not limited to, plastic or plastic like materials, metals, composite materials, wood, paper-based products, carbon fiber, fiberglass, metal alloys, or the like. Moreover, while the exemplary embodiments will be described in relation to a specific map type, it should be appreciated that the scales on the coordinate transformer can be adjusted, for example by replacing the various arms, or by maintaining the arm scale and using a controller to appropriately adjust the directives to accommodate different map scales.

Figure 13:
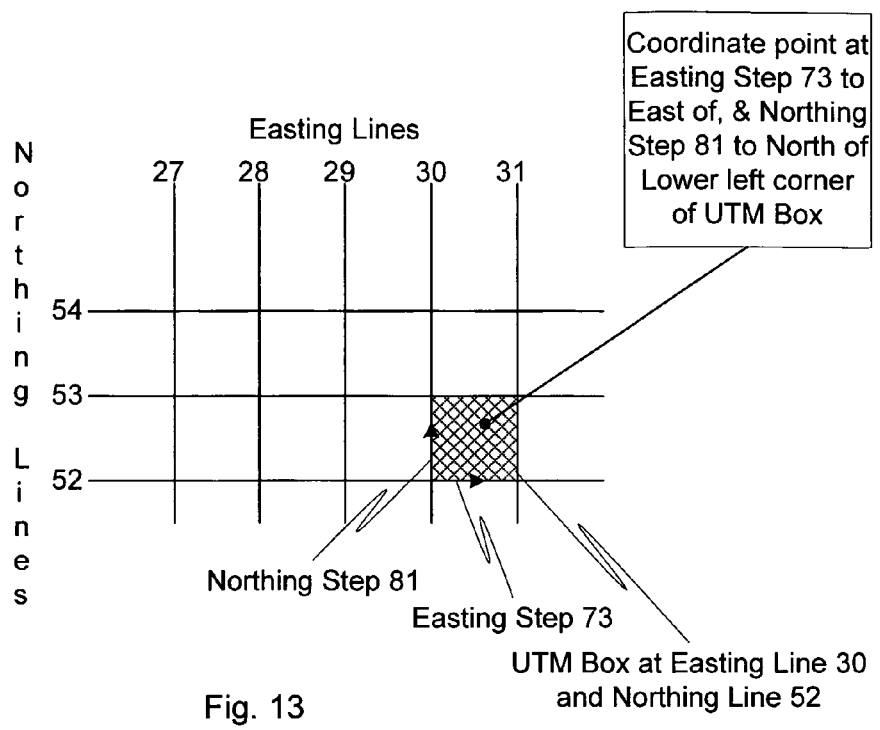
FIG. 13 illustrates basic map reading for use in conjunction with this invention.

It is assumed that the user has the appropriate maps to work with the coordinate transformer and these maps include perpendicular, equilateral coordinate lines such as the Universal Transverse Mercator (UTM) or its military equivalent GPRS and a source of coordinates to be plotted on the map such as from a GPS receiver. The UTM coordinates for a provided location are normally given as two sets of seven digits each with the first set of digits being the Easting set and the second set of digits being the Northing set. From these digits, a line number and step number can be determined for the Easting and the Northing coordinates. The Easting and Northing line numbers designate the lower left corner of the UTM box on a map at the desired location. The four sides of the box are defined by the Easting and Northing lines and the next line to the East and the next line to the North. The Easting step numbers show how far to the East the desired coordinate location is from the lower left hand corner of the box, and the Northing step number shows how far to the North the desired coordinate location is from the lower left-hand corner of the box (see FIG. 13).

Figure 14:
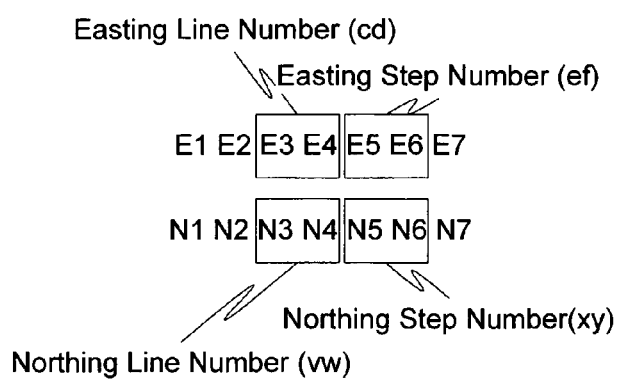
FIG. 14 illustrates an exemplary method of transforming coordinates according to this invention.

As discussed above, the UTM coordinates for a provided location are normally given as two sets of seven digits each, with the first set the Easting set and the second set the Northing set. With reference to FIG. 14, if the digits are designated as E1-E7 for the Easting coordinate and N1-N7 for the Northing coordinate, the digits can be coded as illustrated in the figure. The digits E7 and N7 add to the accuracy of the designated steps but can not be discerned on a map of scale equivalent to a 7.5 minute topographic map or maps of less resolution. If a higher resolution map were used, the E7 and N7 digits can be added into each step value, changing it from a two digit to a three digit number.

Typical 7.5 minute topographic maps printed by the U.S.G.S. are approximately 27 inches high and 22 to 23 inches wide. To facilitate ease of mobile use, these maps can be folded in half, although not limited thereto, for use with the coordinate transformer. The coordinate transformer device is affixed to the folded map, for example, by a friction fit between the two portions of the alignment arm, which can be slightly longer than the height of the map being affixed to (discussed hereinafter) and the alignment arm alignment marks aligned with a convenient coordinate line on the map. The alignment arm need not be limited to being longer than the map but could also be shorter than the map with, for example, an open end into which the map is slid. The alignment marks 25 are shown in the center of the alignment arm 20 however they can be placed other wise such as being placed on both sides of the alignment arm, with the right mark used when the transverse arm is chosen to project to the east, and the left mark used when the transverse arm is chosen to project to the west. Utilizing this alignment methodology, the coordinate transformer is able to accommodate any misalignment in placing the map in, for example, a map holder and can also accommodate the longitude-dependent skew that exists in the UTM coordinate system relative to the map border and the true North-South and East-West coordinate lines.

While the exemplary embodiment illustrated in FIG. 1 shows the alignment arm in the substantially vertical direction, it will be appreciated with reference to additional embodiments illustrated herein that the coordinate transformer can also be utilized with the traverse in various orientations relative to the alignment arm. The traverse arm can be attached via, for example, a friction fit, a locking pivot mechanism, nut and screw configuration, frictional fit with detents that allow the traverse arm to be held perpendicular to the alignment arm, or the like. The traverse arm is set along a coordinate line orthogonal to the coordinate line that the alignment arm is aligned to. This can be accomplished by allowing the traverse arm 30 to slide relative to the alignment arm and lock thereto. For example, the alignment arm 20 can contain a slot (not shown) along its length through which the traverse arm-locking pivot 80 slides.

The traverse attachment 50 slides on the traverse arm and is set to the various coordinate lines crossing the traverse arm, which are parallel to the alignment arm. The traverse step adjuster 35 moves the traverse step slide 55 relative to the traverse attachment 50 and can be set to a position between the coordinate lines parallel to the alignment arm 20. The orthogonal attachment 40 is connected to the traverse step slide 55 and moves in the transverse direction together with the traverse step slide 55 along the traverse attachment 50. The orthogonal step slide 48 moves relative to the orthogonal attachment 40 in the orthogonal direction. The orthogonal step adjuster 45, in similar manner to the traverse step adjuster 35 can be used to adjust the position of the orthogonal step slide 48 relative to the orthogonal attachment 40. Therefore, the orthogonal step adjuster 45 can be used to manipulate the position of the orthogonal step slide 48 between the coordinate lines orthogonal to the coordinate line that the alignment arm is aligned to.

There are at least two methods to utilize the coordinate transformer according to this invention. A first exemplary method moves the traverse arm 30 along the alignment arm and is locked in an appropriate position via the traverse arm-locking pivot 80. The second exemplary method allows the traverse arm 30 to be aligned and locked along a convenient border coordinate line. The orthogonal step slide 48 is provided to slide within the orthogonal attachment 40. The You Are Here slider 60 moves by increments on the orthogonal step slide 48 and is moved to the appropriate orthogonal line as discussed hereinafter.

In accordance with the first exemplary embodiment, the You Are Here slider 60 is provided at a proper offset along the orthogonal step slide 48 to indicate the position on the map indicated by a given coordinate after the coordinate transformer has been positioned to the correct two lines of the UTM box and the correct two steps.

With the second method outlined above, the orthogonal step adjuster 45 is temporarily set to zero and the You Are Here slider 60 moved on the orthogonal step 48 to the given orthogonal line coordinate. The orthogonal step adjuster 45 is then adjusted to the proper step adjustment, and this action together with the traverse line and step adjustment places the You Are Here marker at the correct coordinate position on the map. As discussed in more detail hereinafter, both the orthogonal step adjuster 45 and the traverse step adjuster 35 can include numbered increments that are calibrated to, for example, a specific type of map being used. Both of these adjusters are also envisioned as being interchangeable to accommodate different maps as appropriate.

Figure 2:
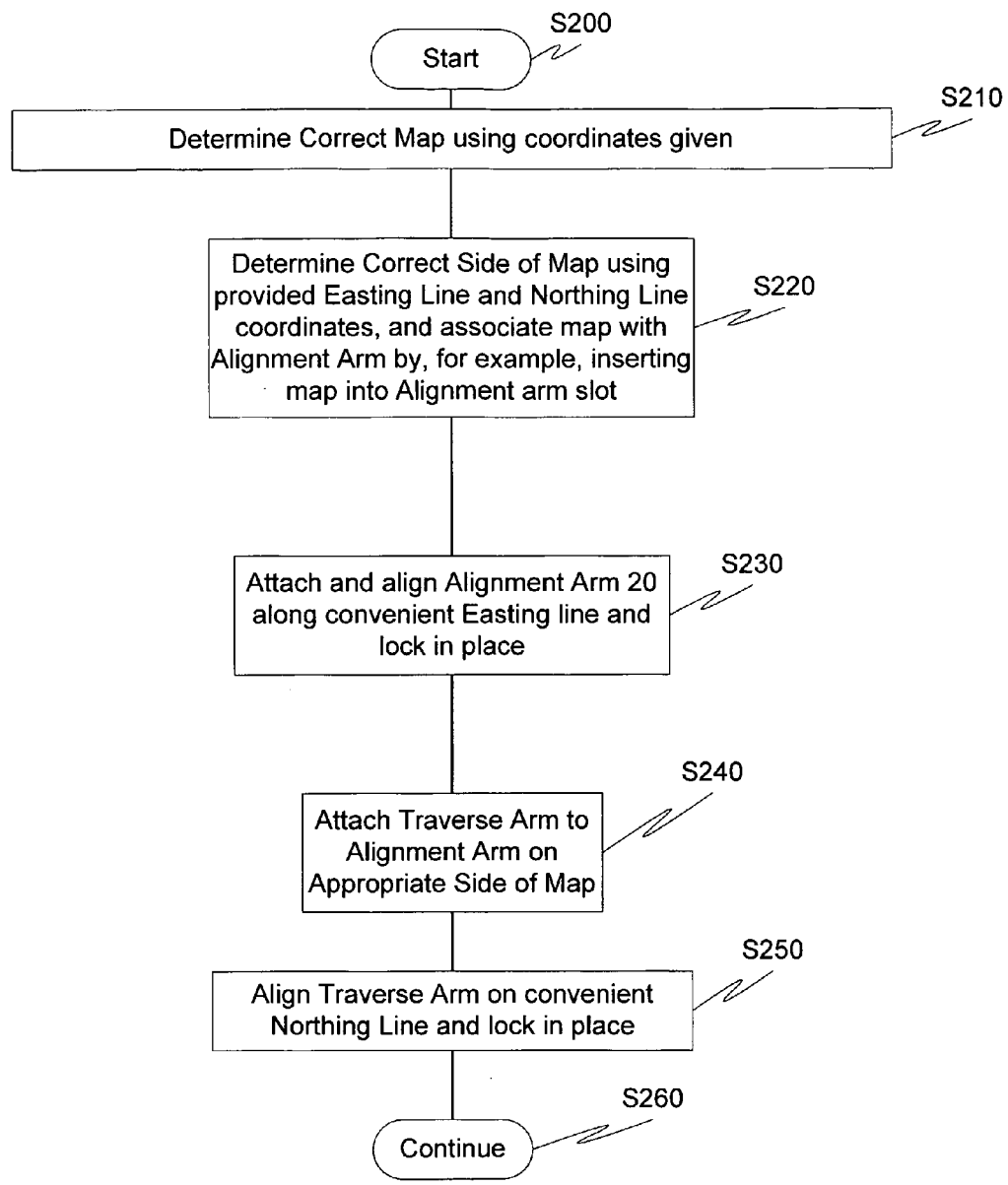
FIG. 2 is a flowchart outlining an exemplary method of setting-up the coordinate transformer for use according to this invention.
Figure 3:
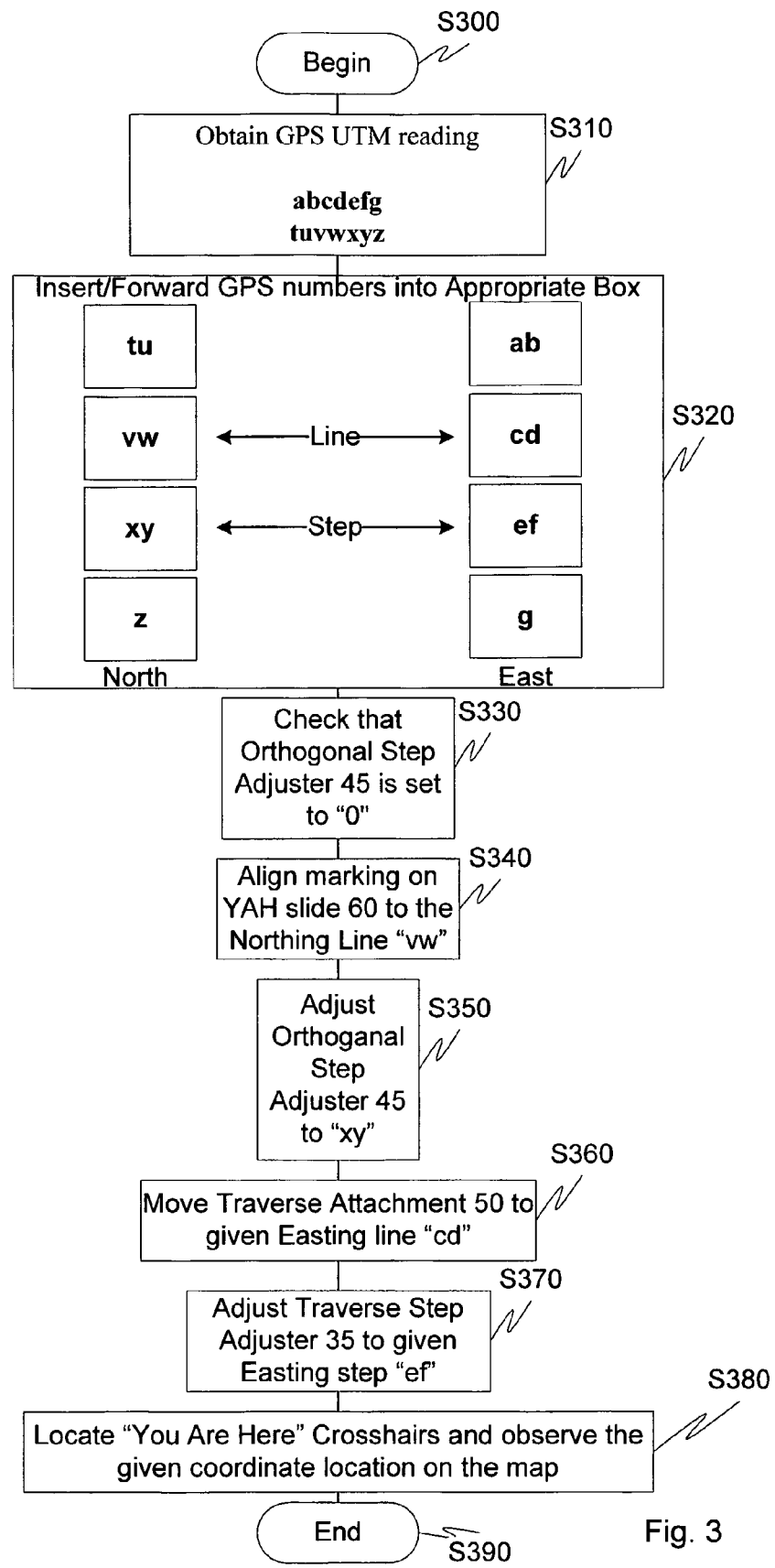
FIG. 3 is a flowchart outlining the exemplary method of using the coordinate transformer according to this invention.

FIGS. 2-3 outline an exemplary method of using the coordinate transformer according to an exemplary embodiment of this invention. FIG. 2 illustrates an exemplary method to set-up the coordinate transformer for use with an area of interest on the map. FIG. 3 provides the exemplary method for performing coordinate transformations within that area of interest. The set-up method shown in FIG. 2 will be performed again if the area of interest on the map is moved.

Control begins in step S200 and continues to step S210. In step S210, the appropriate map is determined and selected. Next, in step S220, and if appropriate, the correct side of the map is chosen. Then, in step S230, the alignment arm of the coordinate transformer is placed in a usable position relative to the map. Control then continues to step S240.

In step S240, the traverse arm is attached to the alignment arm on the appropriate side of the map, if applicable. For convenience, the traverse arm can be attached to either side of the alignment arm by virtue of, for example, a slot (not shown) and traverse arm locking pivot as previously discussed or by unlocking the traverse arm locking pivot and rotating the attached traverse arm to the opposite side of the alignment arm. Next, in step 250, the traverse arm is aligned with a convenient Northing line and control continues to step S260, which jumps to step S300.

Once the basic initialization and setup of the coordinate transformer has been performed, provided the user wants to locate various positions within the same general area the user only need perform the steps illustrated in exemplary FIG. 3. More specifically, control begins in step S300 and continues to step S310. In step S310, the GPS UTM, or equivalent, readings are obtained. Next, in step S320, the GPS UTM reading is translated into an East line number, an East step number, a North line number and a North step number. This can be done manually, for example in accordance with FIG. 14, and/or automatically, for example, via the GPS receiver forwarding the information to the coordinate transformer, which may or may not be displayed thereon as discussed in relation to the embodiment illustrated in FIG. 6. The orthogonal step adjuster is set to zero in step S330, and, in step S340, the You Are Here slider is aligned with the Northing line vw. Next, in step S350, the orthogonal step adjuster is adjusted to the xy position. For example, the orthogonal step adjuster can include a scale that corresponds to the step number. Additionally, the coordinate transformer can include, for example, a linear scale and can cooperate with a GPS receiver unit, local controller or the like, so that as the orthogonal step adjuster is moved, real-time location information about the step number can be provided and, for example, displayed to the user via a display device. Control then continues to step S360.

In step S360, the traverse attachment is moved to the provided Easting Line cd. Next, the traverse step adjuster moves the traverse step slide at the East step value ef, and as with the orthogonal step adjuster, can communicate with and display information associated with the GPS receiver, remote site, or the like. Control then continues to step S380, where the "You Are Here" crosshairs are located on the map and the position corresponding to the GPS coordinates revealed. Control then continues to step S390 where the control sequence ends.

Figure 4:
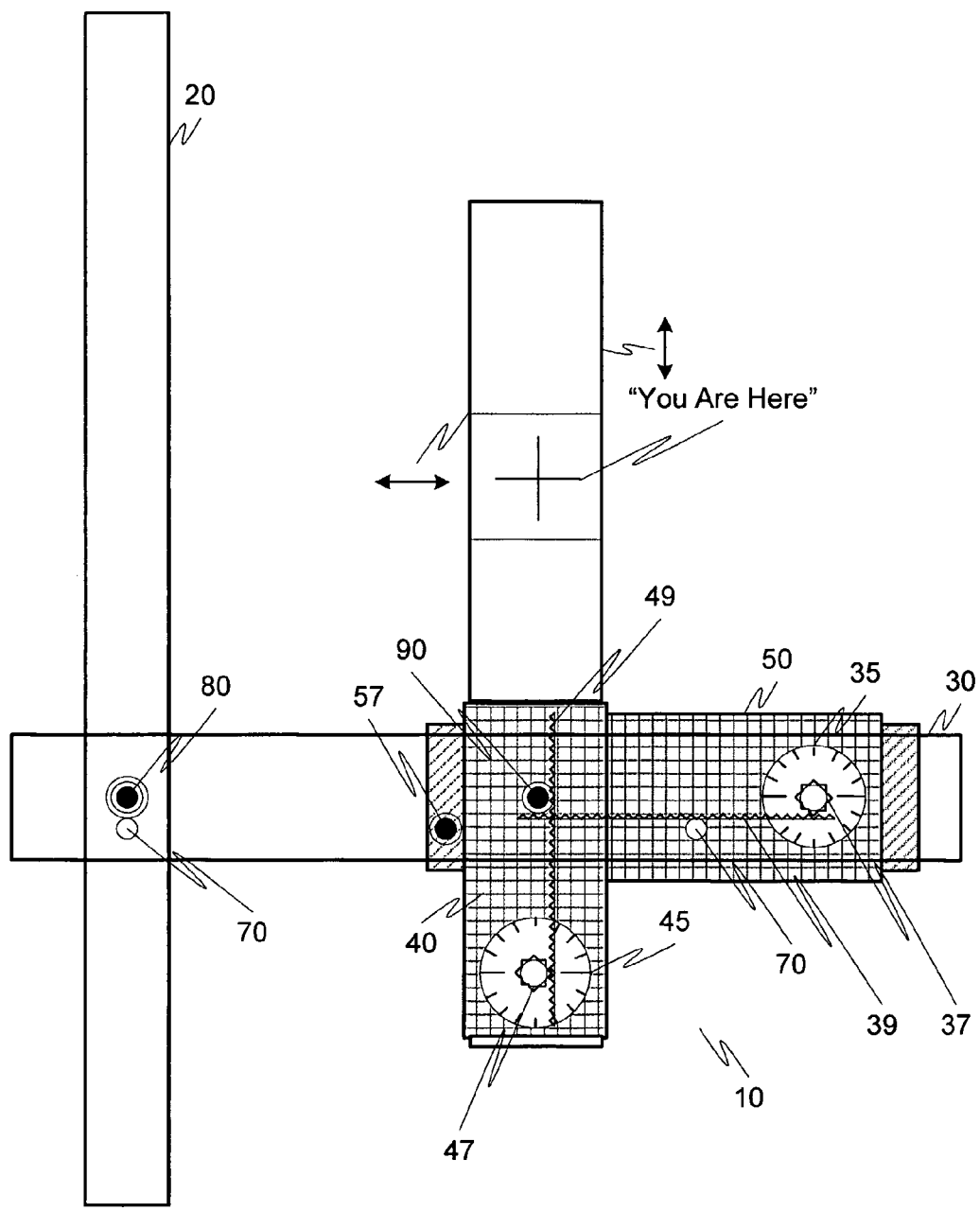
FIG. 4 illustrates a first exemplary embodiment of the coordinate transformer according to this invention.

FIG. 4 illustrates another exemplary embodiment of the coordinate transformer 10. In accordance with this exemplary embodiment, the orthogonal step adjuster 45 and traverse step adjuster 35 are provided with gear mechanisms, 47 and 37, respectively. Each of these gear mechanisms respectively cooperates with racks 49 and 39 in a rack-and-pinion type configuration. However, it should be appreciated that the embodiment is not limited to this particular configuration but could also use a frictional, instead of rack-and-pinion system or in general, any mechanical and/or electromechanical mechanism(s) whereby the rotation of the step adjusters moves the orthogonal step slide and/or the traverse attachment.

Figure 5:
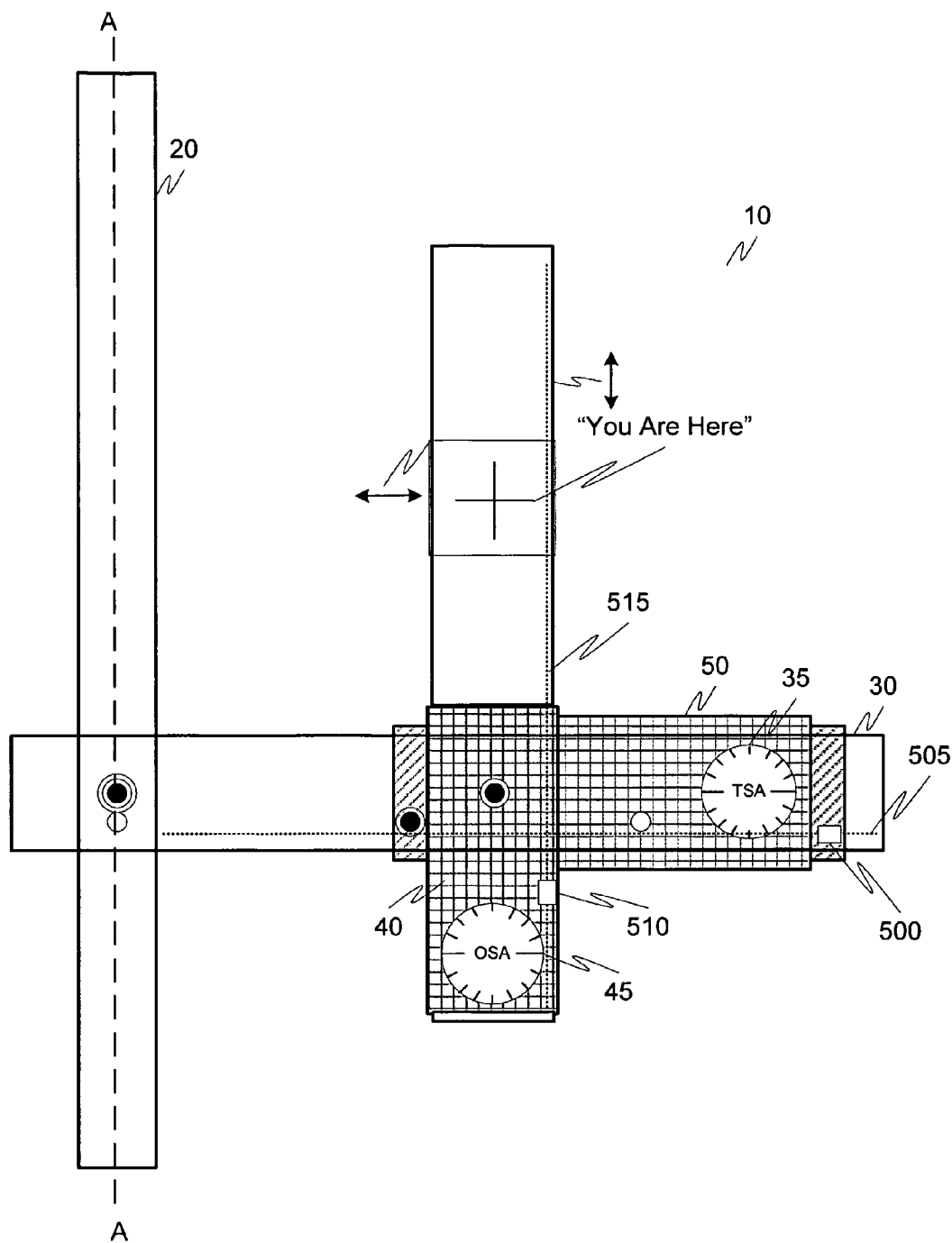
FIG. 5 illustrates a second exemplary embodiment of the coordinate transformer according to this invention.

FIG. 5 illustrates the exemplary embodiment of the coordinate transformer 10 that includes a linear scale that is associated with the traverse arm 30 and a linear scale associated with the orthogonal step slide 48. Each linear scale comprises a scale (505 and 515) fixably disposed on each of the traverse arm 30 and/or orthogonal step slide 48 with a corresponding measuring circuit (510 and 500) that measure the location of the orthogonal step slide relative to the you are here slide 60 relative to the orthogonal attachment 40, and the traverse attachment relative to the traverse arm and the traverse step slide 55 to the traverse arm 30. Additionally, a linear scale could be associated with the alignment arm 20 or any other component of the coordinate transformer where the location of one element relative to another is desired. The linear scales can be one or more of inductive, capacitive, magnetic, or in general any type of linear scale that allows the position of one element to be determined relative to another element could be used with equal success with the systems and methods of this invention.

Thus, for example, the coordinate transformer can be equipped with a display unit (not shown in this embodiment) that can display the position of one or more of the orthogonal step slide and traverse attachment to assist with placement of the You Are Here crosshairs.

Figure 6:
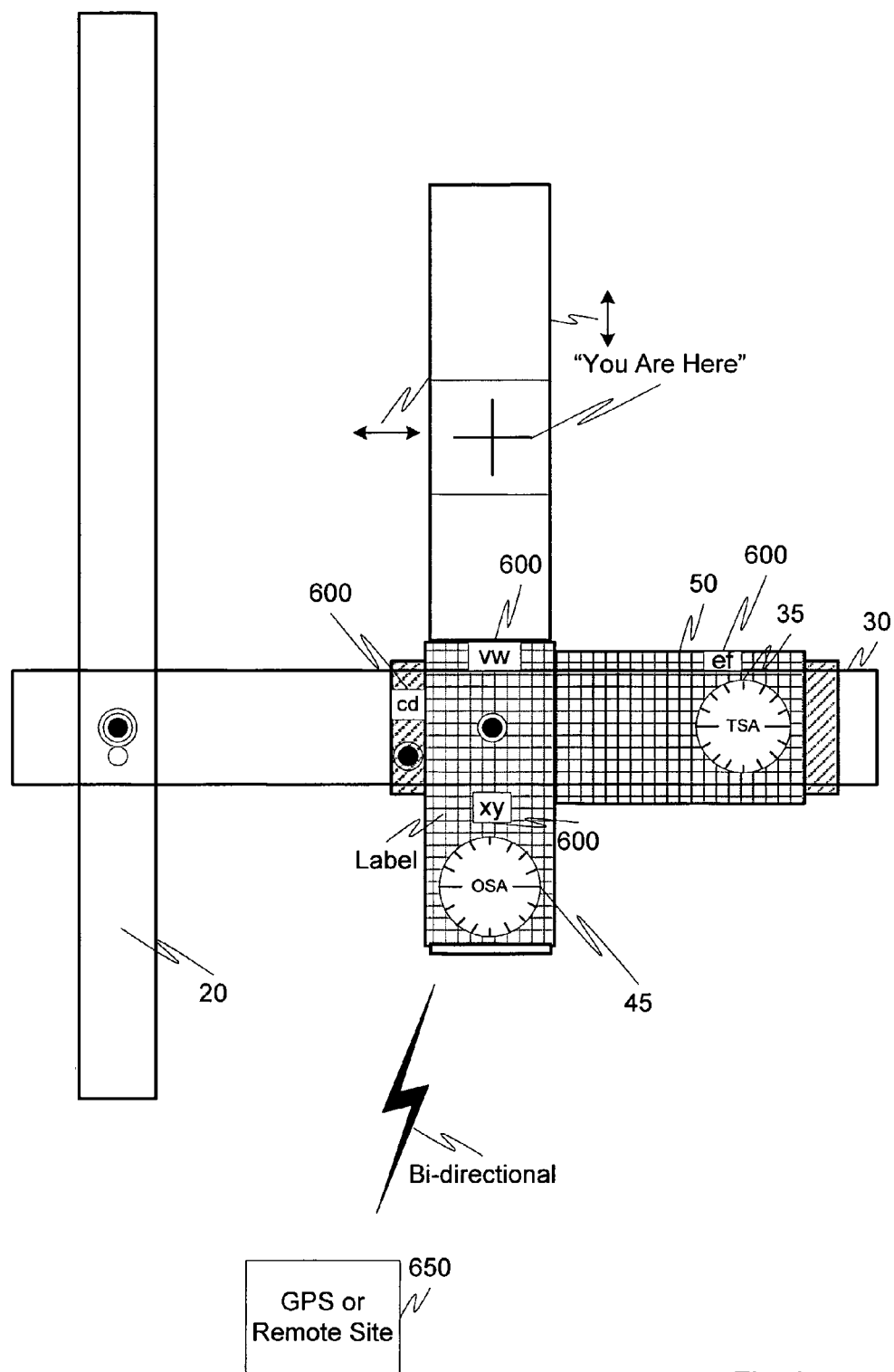
FIG. 6 illustrates a third exemplary embodiment of the coordinate transformer according to this invention.

FIG. 6 illustrates another embodiment of the coordinate transformer that includes a plurality of displays 600, each of which correspond to specific UTM coordinates. It should be appreciated that this embodiment could include features of other embodiments such that the coordinate transformer is capable of being in communication with a GPS receiver 650 or remote site and the UTM coordinates populated into the various displays 600 automatically and shown to assist with the placement of the You Are Here crosshairs or coordinate transformer measurements may be may be made and communicated to a GPS receiver or to a remote site, or the like. For example, visual and/or audio cues such as up or down arrows could be included in the appropriate display 600 to instruct the user regarding the direction of movement required of one or more of the orthogonal step slide and traverse attachment 50 and traverse step slide 55 to place the You Are Here slider 60 in the appropriate location on the map. Moreover, the location, size and color of the displays can be varied as appropriate.

Figure 7:
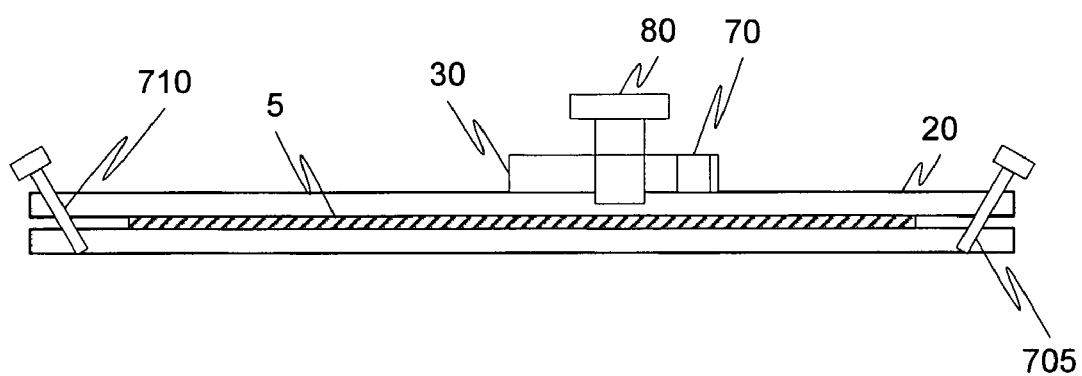
FIG. 7 is a cross-sectional view of the alignment arm taken along line A-A of FIG. 5.

FIG. 7 illustrates a cross-sectional view taken along line A-A of FIG. 5. More specifically, the alignment arm 20 is illustrated with the map 5 frictionally engaged between the two portions of the alignment arm. The alignment arm 20 further includes set screws 705 and 710, however is not limited thereto and can include any mechanism that allows for the alignment arm to be held in a fixed position relative to the map including, but not limited to, clips, snaps, elasticized members, or the like. Furthermore, the alignment arm could be made slightly flexible with a slot cut therein that the map 5 can be inserted into. By virtue of the construction of the alignment arm 20, the map 5 would be held in place with sufficient space from the map ends to the fixing means to accommodate misalignment of the map and to accommodate the UTM angle errors prior to tightening the fixing means, such as set screws.

Figure 8:
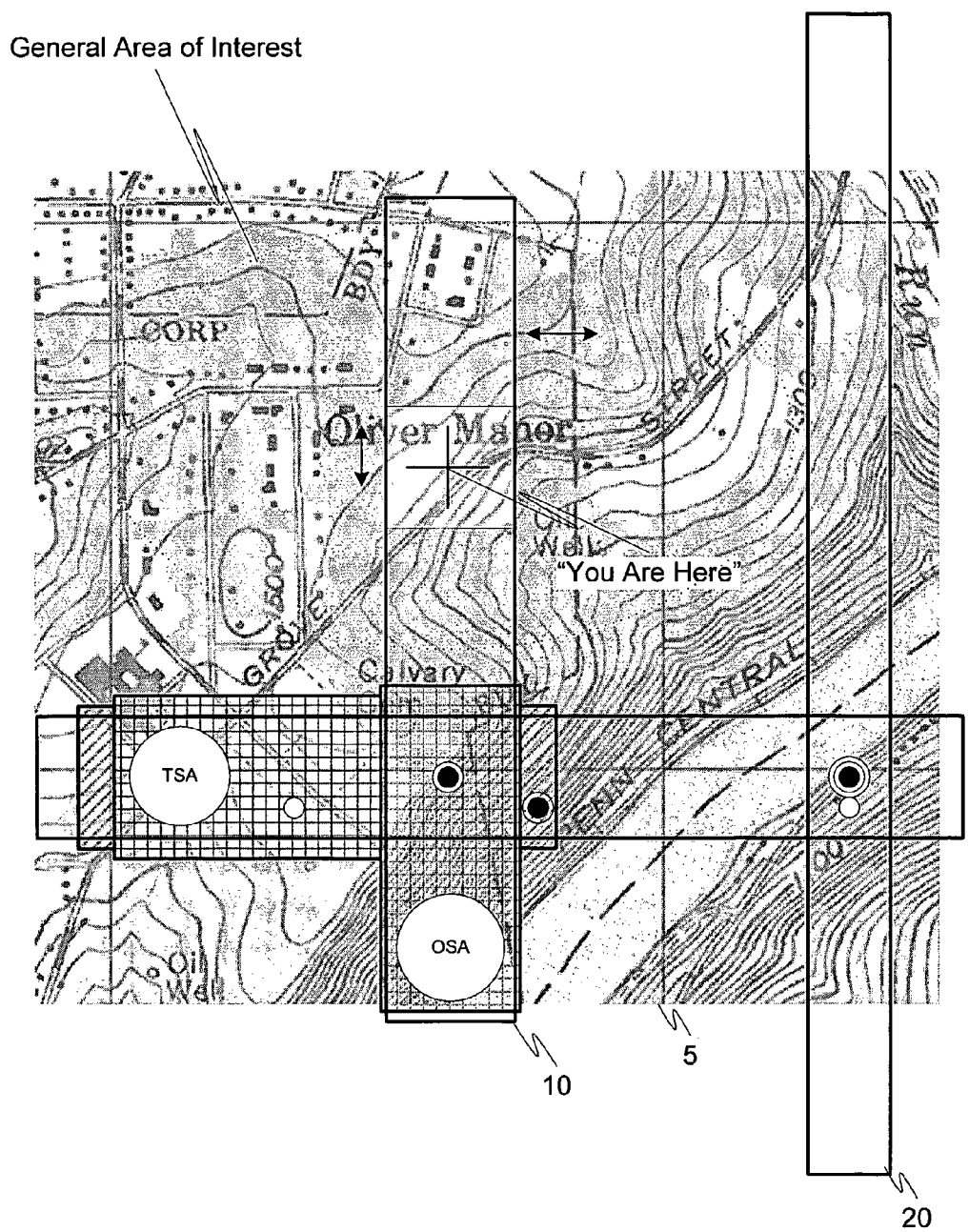
FIG. 8 is a fourth exemplary embodiment of the coordinate transformer according to this invention.
Figure 9:
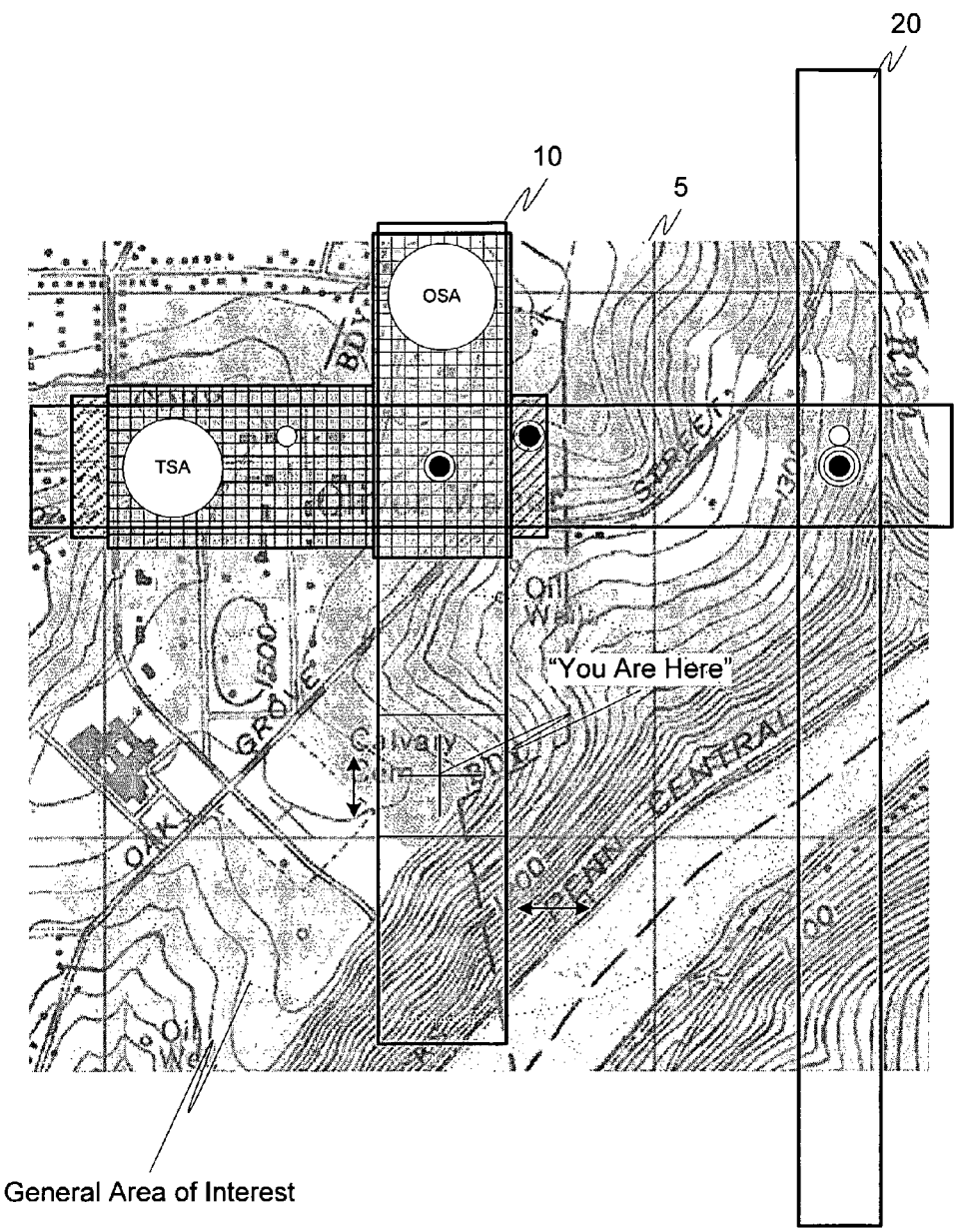
FIG. 9 is a fifth exemplary embodiment of the coordinate transformer according to this invention.
Figure 10:
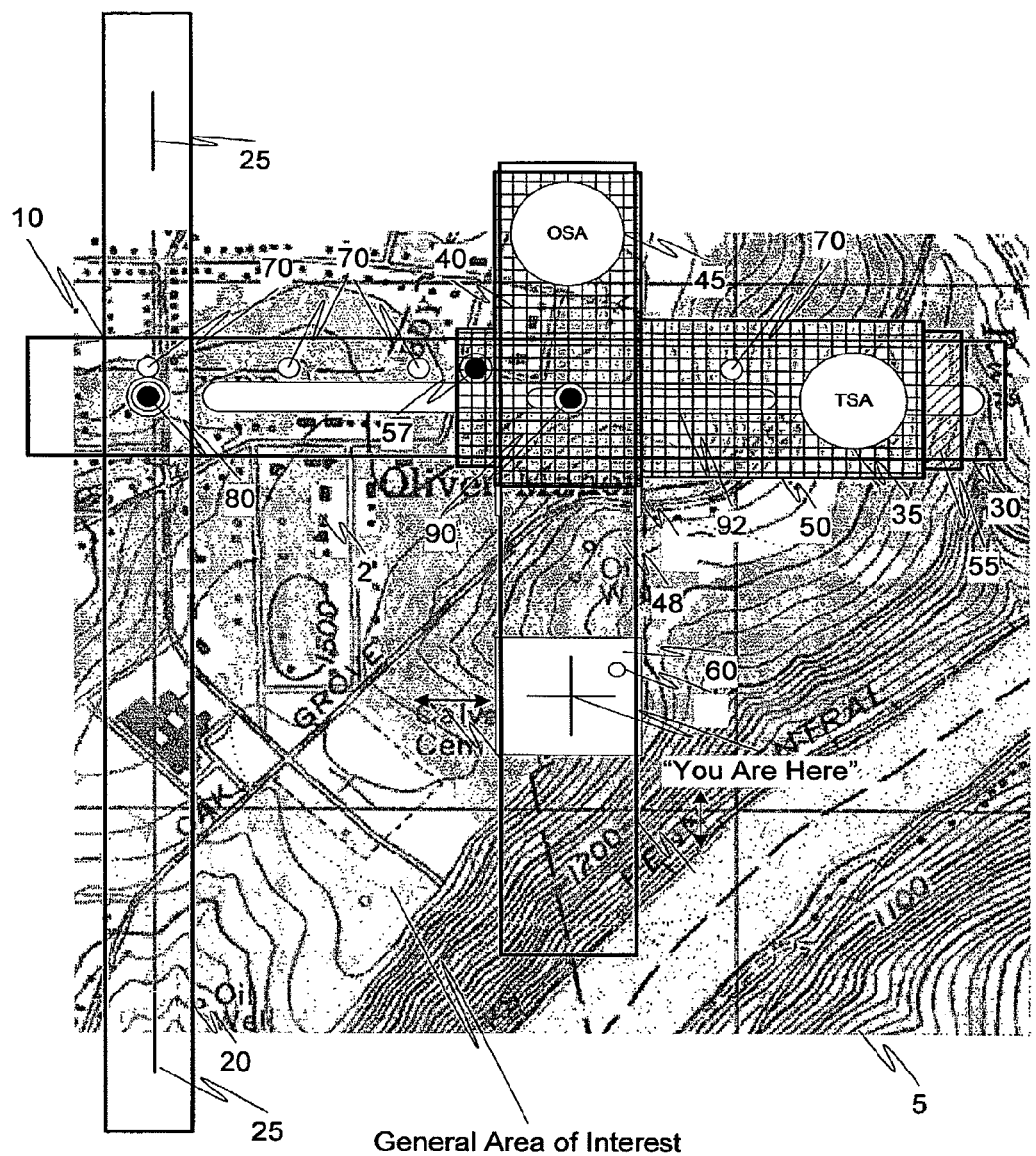
FIG. 10 is a sixth exemplary embodiment of the coordinate transformer according to this invention.

FIGS. 8-10 show various exemplary orientations of the coordinate transformer 10. For example, as previously discussed, it may be advantageous to position the alignment arm and the traverse arm in different locations depending on the anticipated portion of the map that will be used.

An exemplary attribute of the transformer uses a traverse arm 30 that is rotatable around a pivot 80, and uses an orthogonal step arm 48, rotatable around a pivot 90, which can slide along the length of a slot 92 in traverse arm 30, so that the coordinate transformer can transform over a map area of interest in any of four orientations. Orientation one was shown previously in FIGS. 1, 4, 5 and 6, and orientation two is shown in FIG. 8, orientation three is shown in FIG. 9, and orientation four is shown in FIG. 10. These four orientations allow the operator to choose an orientation that covers the largest area of interest to the operator with the minimum amount of obscuration, and in addition allows the operator to choose the orientation that more easily allows the operator to move to an adjacent area of interest when that becomes necessary.

In addition the orientation choices allow the transformer to provide transformation on the partial map UTM areas that appear adjacent to the west and south map borders, which have missing portions of the UTM areas including missing easting or northing lines because they fall in the margin of the map. Orientations 2 and 3 allow transformation of the partial UTM section just east of the west map border and Orientations 3 and 4 allow transformation of the partial UTM section just north of the south map border. (There is no problem in the partial map sections at the east and north map borders because the UTM given line is always on the lower left of the UTM area, therefore these lines always appear on the map next to the partial UTM sections located adjacent to the east and north map borders.)

The pivoting arms that provide this multi-orientation capability can include two scales for each arm because of the reversal of the lettering/numbering and the direction of the scale, since the UTM lines are always on the lower left of the UTM area. In this design the two scales both appear to the operator, each with the correct scale for one of the orientations, but the operator's eye chooses the correct scale as the right-side-up scale relative to the operator who is observing the map annotation right-ride-up. Also instructional text can be made orientation unique by using the same method, allowing the operator's eye to choose the right-side-up text for the orientation in use.

FIG. 11 illustrates the coordinate transformer in a folded position. By virtue of the attaching mechanisms between the alignment arm, traverse arm, and orthogonal step slide, the coordinate transformer 10 is able to be folded upon itself, and thus easily stored. The coordinate transformer may be folded with the traverse arm 30 over the orthogonal step slide 48 and both over the alignment arm 20 as shown in FIG. 11 or an offset pivot from the traverse arm locking pivot point may be included which places the folded traverse arm 30 over the orthogonal step slide 48 next to the alignment arm 20 rather than on the top.

As illustrated in FIG. 12, the folded coordinate transformer 10, an optionally rolled map, can be placed in a satchel 1200 that includes a strap, clip, or the like 1205 which attaches a little above, for example, the front belt line of the operator and a strap arrangement 1210 that goes over the shoulder and attaches to the operator's body to secure the satchel. The length of coordinate transformer in the pouch can be such that it may be angled slightly in a direction towards the side of the body, and will not interfere with the bent leg when sitting or crawling, nor will it interfere with the person in other positions or actions or with backpack straps or belt. Other adjustable mechanisms may be included to provide fit for multiple operator sizes and to loosen or tighten based on the type of operator activity. However, it should be appreciated that most any type of containment mechanism can be made to work well including containment mechanisms that may be affixed by one or more of hook and loop fasteners, belts, straps, or the like and may be attached to one or more of the user, a backpack, a portion of the body such as an arm or leg, a piece of apparel such as a jacket or shirt, or the like.

The coordinate transformer also allows quick and easy set up such that a large area of interest on the map can be clearly displayed and, over that area, the coordinate transformer adjusted to transform various coordinates to indicate a position on the map. This can easily be accomplished by a single person without the need for additional supporting structures such as a table. Moreover, the area of interest can be easily modified and the coordinate transformer moved for use on another area of the map. While the exemplary system is described with a purely mechanical configuration without the need for electrical power, embodiments are also described that include display elements, linear scales, and the like. Additionally, the coordinate transformer can include motorized elements and can contain a GPS or cooperate with, for example, a GPS receiver or remote site to facilitate placement of the You Are Here crosshairs or to transfer the coordinates determined by operator placement of the transformer on the map to a GPS receiver or a remote site. Even with these enhanced embodiments, the device may still be used in a mechanical fashion as a fail-safe backup.

An enhancement that does not require adding electric power can provide the compass heading from the You Are Here to another position of interest, by utilization of a string that can be retrieved from a mounted container and moved through the You Are Here center to the position of interest. A protractor (not shown) or a portion of a protractor that can be rotated around the center position under the string can be made to read the desired compass heading, and can also compensate for the magnetic declination and the UTM grid error. When a portion of the protractor is used it can be made on a straight scale on an offset arm around the "you are here" point such that it can be easily folded up for stowing, and the various scales to cover 360 degrees can be printed in orientations such that the correct scale will appear right side up to the operator for each orientation of the partial protractor. The string could then be returned to its container, for example, by being spring loaded. Moreover, the string could be associated with the You Are Here slider and, for example, be tied to a spring-loaded mechanism so that the string is always readily available and associated with the coordinate transformer. Additional enhancements to the basic system further utilize communication mechanisms, local position sensors on the devices to provide operator directives for movement of the devices in a low power mode and could include motors to automatically move the devices in a higher power mode and readout devices that indicate the coordinate location by projection or by, for example, pixels in a field without physically having to move the components. Two-way communication between the GPS receiver and/or a remote site and the coordinate transformer can also be provided. Thus, the coordinate transformer could display received coordinates, and could supply new coordinates based on the operator indicating a position of interest while using the device. The amount of information to be transferred in either can be reduced after the first transfer of a coordinate is received since only the relative change to a prior point is needed for transmission. The coordinate transformer also gains the capability of coding coordinates provided by the operator positioning of the device because of the inclusion of position sensors in the device. The coordinate transformer can also use the position sensors to provide visual and/or audible cues to the operator as directives to move the device to the given coordinate location in a manner that uses less power than providing motion by motors.

It is therefore apparent that there has been provided, in accordance with the invention, systems and methods for navigation.

Figure 15:
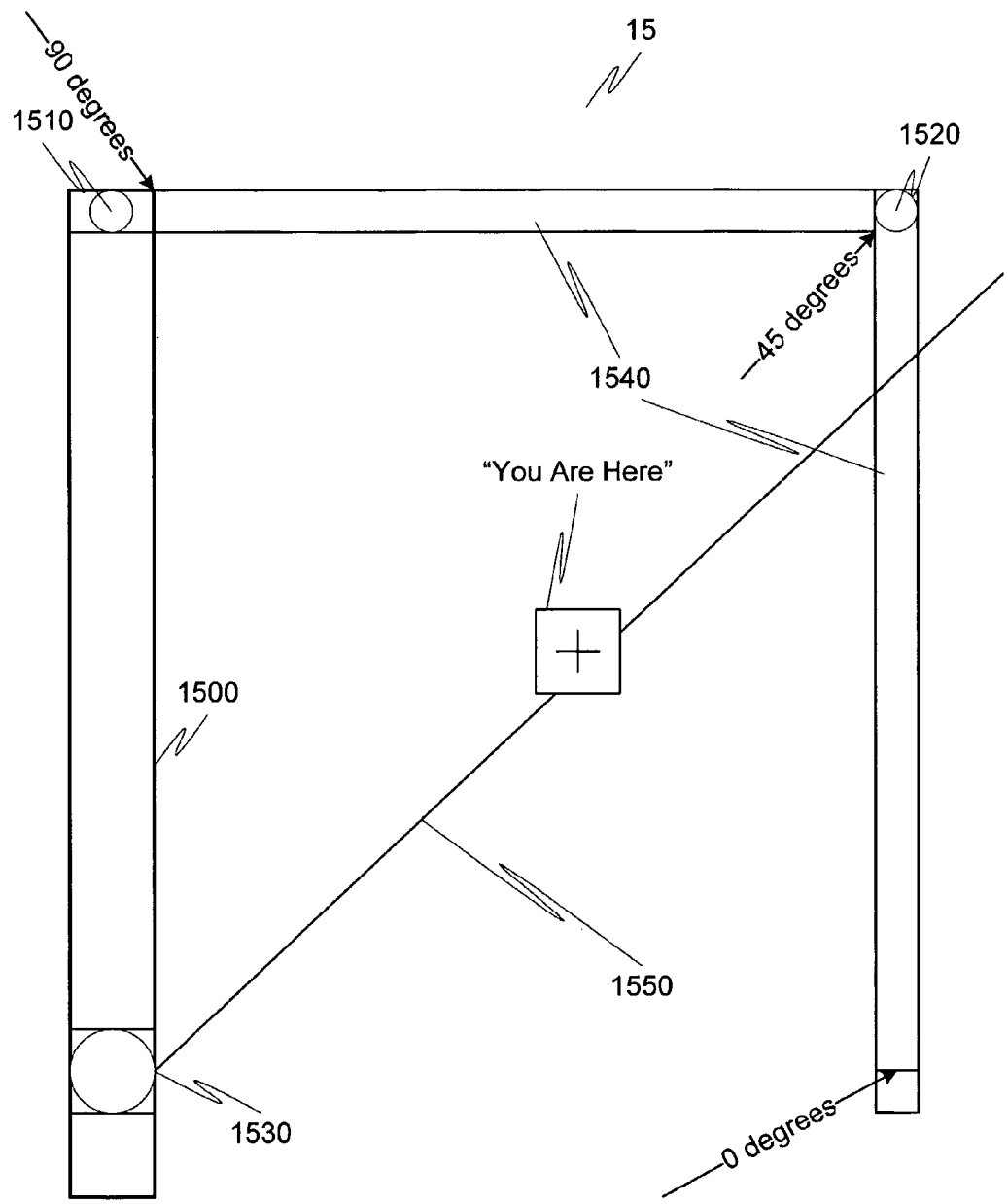
FIG. 15 illustrates an exemplary embodiment of a polar coordinate configuration.

Another exemplary embodiment is illustrated in FIG. 15. A polar coordinate type coordinate transformer 15 having a given arm arrangement is illustrated. Specifically, the coordinate transformer includes an alignment arm 1500, a first pivot 1510, a second pivot 1520, a third pivot 1530, folding protractor arms 1540, a rotating arm 1550 and a you are here slide. In use the alignment arm 1500 is set on a vertical coordinate line on either side of the map area of interest. The pivot 1530 is slid on the alignment arm 1500 until the pivot 1530 it is on a horizontal coordinate line on the edge of the area of interest. The equal length protractor arms 1540 are unfolded around the area of interest (to make a U shape with the alignment arm). The 0° mark of the protractor arm 1540 is aligned with the pivot 1530 of the rotating arm 1550 (as illustrated, the pivot 1530 of the rotating arm 1550 and the 0° of the protractor arm could be on the same horizontal coordinate line). The rotating arm 1550 is rotated around the pivot and over the protractor arms 1540 (which can included scaled increments from 0° to 90°), to the directed angle. The you are here slide is moved to the directed length value. The you are here slide then is over the location on the map designated by the directives derived from the given coordinates. The rotating arm's length could also be collapsible so that the end signifies the you are here point, which would also make the arm easier to stow. While a specific configuration of the arms is shown, it should be appreciated that a number of modifications and alternative mechanical assemblies are possible provided they have an alignment arm to which a protractor type assembly is affixed and to which a you are here arm is used to locate the desired angle.

While this invention has been described in conjunction with a number of embodiments, it is evident that many alternatives, modifications and variations would be or are apparent to those of ordinary skill in the applicable art. Accordingly, the invention is intended to embrace all such alternatives, modifications, equivalents, and variations that are within the spirit and scope of the invention.

The invention claimed is:

1. A navigation assistant comprising:
   an alignment arm designed to be aligned with an easting line of a map;
   a traverse arm, perpendicular to the alignment arm in the operational position;
   an orthogonal attachment;
   a traverse attachment;
   a traverse step slide;
   an orthogonal step slide; and
   a you are here slide.

2. The device of claim 1, wherein the traverse attachment slides on the traverse arm and is set to various coordinate lines that cross the traverse arm, which are parallel to the alignment arm.

3. The device of claim 1, wherein the traverse step adjuster moves the traverse step slide relative to the traverse attachment and can be set to a position between the coordinate lines parallel to the alignment arm.

4. The device of claim 1, wherein the orthogonal attachment is connected to the traverse step slide and moves in the transverse direction together with the traverse step slide along the traverse attachment.

5. The device of claim 1, wherein the orthogonal step slide moves relative to the orthogonal attachment in an orthogonal direction.

6. The device of claim 1, wherein the orthogonal step adjuster is configured to adjust the position of the orthogonal step slide relative to the orthogonal attachment.

7. The device of claim 1, wherein the orthogonal step adjuster is configured to manipulate the position of the orthogonal step slide between coordinate lines orthogonal to a coordinate line to which the alignment arm is aligned.

8. The device of claim 1, wherein the navigation assistant is foldable.

9. The device of claim 1, wherein the traverse arm is pivotally attached to the alignment arm.

10. The device of claim 1, further including fastening means for attachment to a body and a protective sheath.

11. A method of using a navigation device comprising:
    acquiring navigational coordinates;
    decoding the navigation coordinates to obtain easting and northing line and step values;
    aligning a you are here slide with a northing line value;
    adjusting a step adjuster to a northing step value;
    moving a traverse attachment to an easting line value; and
    moving a traverse step adjuster to an easting step value.

12. The method of claim 11, further comprising locating you are here crosshairs and observing a location on a map.

13. The method of claim 11, further comprising determining a correct map and side thereof.

14. The method of claim 11, further comprising associating an alignment arm with a map and aligning the alignment arm with an easting line.

15. The method of claim 11, further comprising affixing a traverse arm to an alignment arm.

16. The method of claim 11, further comprising aligning a traverse arm with a northing line.

17. The method of claim 11, further comprising securing an alignment arm to a map such that the alignment arm is aligned with a convenient easting line.

18. The method of claim 11, further comprising receiving the navigation coordinates from a GPS receiver.

19. The method of claim 11, further comprising displaying the navigational coordinates to a user.

20. The method of claim 11, wherein the northing line is a latitude line and the northing step value is given as a percentage between latitude lines.

21. A navigational device comprising:
    means for acquiring navigational coordinates;
    means for decoding the navigation coordinates to obtain easting and northing line and step values;
    means for aligning a you are here slide with a northing line value;
    means for adjusting a step adjuster to a northing step value;
    means for moving a traverse attachment to an easting line value; and means for moving a traverse step adjuster to an easting step value.

22. A hand-held navigation assistance system comprising:
an alignment arm configured to be aligned and locked on one coordinate line of a map;
a traverse arm configured to unfold to an orthogonal position relative to the alignment arm, and can be moved along either side of the alignment arm and then locked at any position along the alignment arm;
a traverse line attachment configured to be directed to move by map-coordinate-line-spaced increments along the traverse arm;
a traverse step slide configured to be directed to be positioned proportionally within a map-coordinate-line-spaced increment relative to the positioned traverse line attachment;
an orthogonal step slide configured to be stowed along the traverse arm or in an operation mode to project in an orthogonal direction relative to the traverse arm while being positioned along the traverse arm by the traverse step slide, and in operation can be directed to move within a coordinate-line-spaced increment in an orthogonal direction relative to the traverse arm; and
a "you are here" slide configured to be directed to move by coordinate-line-spaced increments along an arm extending from the orthogonal step slide, which includes marking apertures that allow marking of the map.

23. The system of claim 22, further comprising means to receive map coordinate pairs from a source or to send map coordinate pairs identified by internal mechanisms to another operator.

24. The system of claim 22, further comprising a decoding mechanism configured to convert a given map coordinate pair to directives for identifying an appropriate map and for positioning the traverse line slide, the traverse step slide, the orthogonal step slide and the "you are here" slide after the alignment arm and the traverse arm have been initially set on the map.

25. The system of claim 22, further comprising a position measurement mechanism that provides the current position of the traverse line slide, the traverse step slide, the orthogonal step slide and the "you are here" slide.

26. The system of claim 22, further comprising means for producing motive forces to cause a current position to correspond with a directive for the traverse line slide, the traverse step slide, the orthogonal step slide and the "you are here" slide.

27. The system of claim 22, further comprising means for mounting the system to an operator so that the map and system can be quickly stowed, un-stowed and referred to and re-stowed, while en-route by foot, mounted in a saddle or on a seat.

28. The system of claim 22, further comprising means for mounting the system to an operator for stowage that eliminates interference with the operator taking evasive action such as running, crawling, walking, riding or strenuous activity.

29. The system of claim 22, wherein the system and the map are hand-held, or operator-attached and hand-manipulated.

* * * * *